No. 783,640. PATENTED FEB. 28, 1905.
E. K. MYERS.
CAN OPENER.
APPLICATION FILED MAY 5, 1904.
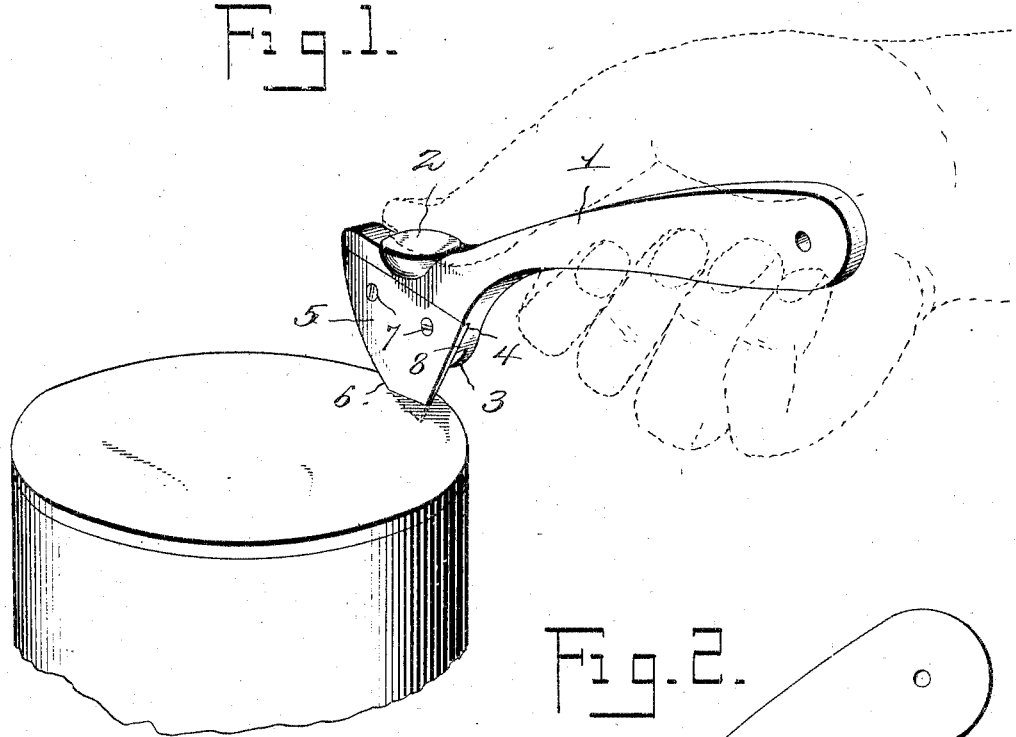
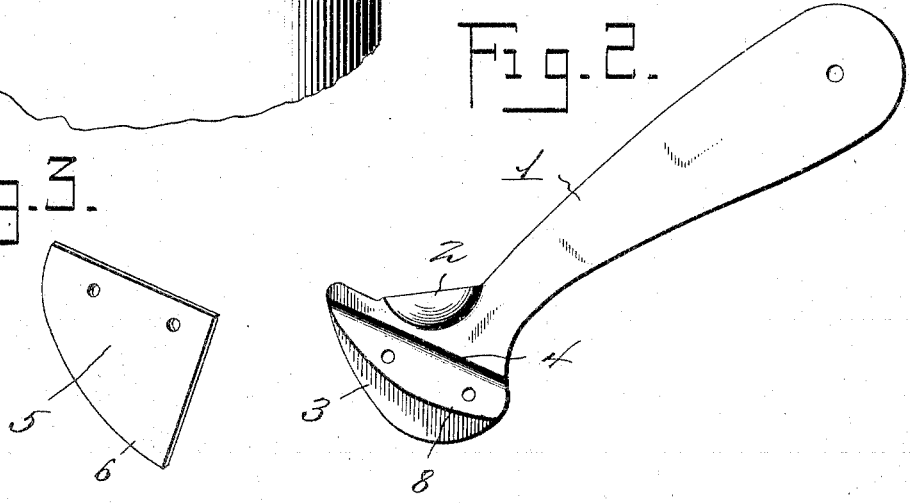
Witnesses
E. T. Stewart
W. H. Clarke
Edward K. Myers,
Inventor.
by C. A. Snow & Co.
Attorneys No. 783,640.

Patented February 28, 1905.

UNITED STATES PATENT OFFICE.

EDWARD KEEN MYERS, OF PRESTON, IOWA.

CAN-OPENER.

SPECIFICATION forming part of Letters Patent No. 783,640, dated February 28, 1905.

Application filed May 5, 1904. Serial No. 206,537.

*To all whom it may concern:*

Be it known that I, EDWARD KEEN MYERS, a citizen of the United States, residing at Preston, in the county of Jackson and State of Iowa, have invented a new and useful Can-Opener, of which the following is a specification.

This invention relates to a can-opener.

The object of the invention is to open a can or paint-pail without leaving jagged or torn edges around the cover. I accomplish this object by means of a can-opener adapted to cut downward and make a round smooth edge instead of the jagged edge made by upwardly-cutting can-openers.

The device which I have invented is cheap, strong and durable in construction, thoroughly efficient in operation, and capable of being quickly sharpened or of receiving a new cutting-blade.

Furthermore, the handle is made with a novel thumb-piece, by means of which it can be more easily held and greater pressure exerted in opening a can.

In order that my invention may be more clearly understood, I will describe it in detail with reference to the accompanying drawings, forming a part of this specification, wherein—

Figure 1 is a perspective view of my improved can-opener grasped in the hand of the user. Fig. 2 is a side view of the handle with the cutting-blade removed, and Fig. 3 is a detail view of the cutting-blade.

The handle of my improved can-opener is designated by the reference-numeral 1. This handle preferably is made of any suitable metal. Near the lower end of the handle a circular bearing-surface 2 is provided to act as a thumb-piece for receiving downward pressure from the thumb in opening a can. Upon one side of the handle, at its lower end, is formed a curved flange 3, the purpose of which is to guide the can-opener around the outer edge of the can.

The handle 1 on the side opposite the flange 3 is recessed, as shown at 4, to receive the cutting-blade 5, which is approximately triangular in shape, the cutting edge 6 being curved outward in the manner illustrated. The cutting-blade 5 is fastened in the cut-away portion 4 of the handle by means of screws 7, which permit it to be readily detached from the handle for sharpening or renewal. It will be observed that a circular bearing-surface 8 is formed on the lower portion of the handle between the flange 3 and the blade 5. This bearing-surface 8 contacts with the upper edge of the can being opened and serves to limit the downward movement of the opener.

In using my improved can-opener the handle is grasped in the fingers of the user, as shown, the thumb resting upon the thumb-piece. The lower pointed end of the blade is forced through the top of the can adjacent to the edge thereof. Then by rocking the device forward, at the same time maintaining the downward pressure upon the handle and thumb-piece, the can-top will be quickly severed from the can without leaving a jagged torn edge, as is usual with can-openers which cut upward. On the contrary, the edge of a can which has been opened with my device presents a rounded, neat, and smooth appearance.

What I claim is—

A can-opener comprising a handle having a head provided on its upper side with a transversely-disposed thumb-rest and on its under side with a curved flange and with a curved bearing-surface having a lateral recess, and a cutting-blade detachably secured in the recess and having a curved cutting edge terminating in a sharp point disposed toward the rear of the handle of the opener.

In testimony that I claim the foregoing as my own I have hereto affixed my signature in the presence of two witnesses.

EDWARD KEEN MYERS.

Witnesses:
A. O. SKINNER,
P. E. MARSH.